United States Patent [19]

Guggenheim et al.

[11] Patent Number: 4,880,899

[45] Date of Patent: Nov. 14, 1989

[54] CYCLIC POLYPHENYLENE ETHER-POLYCARBONATE OLIGOMERS

[75] Inventors: Thomas L. Guggenheim, Scotia, N.Y.; Joseph W. Guiles, Ft. Collins, Colo.

[73] Assignee: General Electric Company, Schenectady, N.Y.

[21] Appl. No.: 164,935

[22] Filed: Mar. 7, 1988

Related U.S. Application Data

[62] Division of Ser. No. 26,517, Mar. 17, 1987, Pat. No. 4,789,725.

[51] Int. Cl.$^4$ .............................................. C08G 63/62
[52] U.S. Cl. .................................... 528/370; 528/196; 528/201; 528/204; 528/371; 528/372
[58] Field of Search ............... 528/370, 372, 371, 196, 528/201, 204

[56] References Cited

U.S. PATENT DOCUMENTS

| | | | |
|---|---|---|---|
| 4,605,731 | 8/1986 | Evans et al. | 528/370 |
| 4,616,077 | 10/1986 | Silva | 528/370 |
| 4,644,053 | 2/1987 | Brunelle et al. | 528/371 |
| 4,736,016 | 4/1988 | Brunelle et al. | 528/370 |

*Primary Examiner*—Harold D. Anderson
*Attorney, Agent, or Firm*—William H. Pittman; James C. Davis, Jr.

[57] ABSTRACT

Cyclic polyphenylene ether-polycarbonate oligomer compositions are prepared from bishaloformates and bisphenols, at least one of which includes a spirobiindane moiety and the other of which is derived from a bisphenol-terminated polyphenylene ether oligomer. The cyclic compositions may be converted to linear copolycarbonates by treatment with a polycarbonate formation catalyst.

13 Claims, No Drawings

CYCLIC POLYPHENYLENE ETHER-POLYCARBONATE OLIGOMERS

This application is a division of application Ser. No. 026,517, filed Mar. 17, 1987, now U.S. Pat. No. 4,789,725.

This invention relates to new cyclic carbonate compositions derived from polyphenylene ethers and methods for their preparation and polymerization.

Polyphenylene ether-polycarbonate copolymers are typically prepared interfacially by reaction of a polyphenylene ether with phosgene and a bisphenol in the presence of a suitable catalyst, in a mixed aqueous-organic phase. This method of preparation is described, for example in U.S. Pat. Nos. 4,374,233 and 4,377,662. Another method, described in copending, commonly owned application Ser. No. 15,639, filed Feb. 17, 1987, now U.S. Pat. No. 4,777,221, involves the reaction of a polyphenylene ether, which may be acid-functionalized, with a polycarbonate in the presence of a polycarbonate-forming transesterification catalyst.

U.S. Pat. No. 4,644,053 describes cyclic polycarbonate oligomer compositions which are readily convertible to polycarbonates having very high molecular weights. Copending, commonly owned application Ser. No. 890,053, filed July 28, 1986 now U.S. Pat. No. 4,696,998, discloses similar methods for the preparation of various cyclic heterocarbonates derived from such polymers as polyamides, polyesters, polyurethanes, polyether ketones, and polyether sulfones.

Cyclic polyphenylene ether-polycarbonate oligomer compositions have potential for being similarly convertible to linear polyphenylene ether-polycarbonate copolymers of high molecular weight. However, it has been found that such oligomer compositions, as a class, are not readily obtainable in high yield by methods analogous to those described in the aforementioned application Ser. No. 890,053. The products may contain such cyclics in minor amounts (e.g., less than 10% of total product) as by-products, but consist predominantly of high polymer and cyclic homopolycarbonates.

By the present invention, there are provided a class of cyclic polyphenylene ether-polycarbonate oligomer compositions which are readily obtainable and are suitable for conversion to linear polymers. Also provided is a convenient method for their preparation.

In one of its aspects, the present invention includes compositions comprising cyclic oligomers containing at least one moiety of the formula

in combination with at least one moiety of the formula

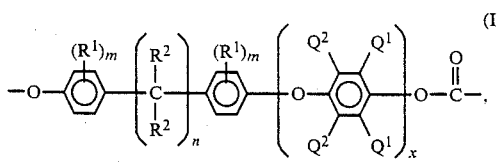

wherein:

A is a divalent spirobiindane radical of the formula

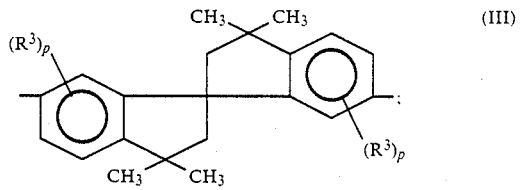

each $Q^1$ is independently halogen, primary or secondary lower alkyl (i.e., alkyl containing up to 7 carbon atoms), phenyl or hydrocarbonoxy;

each $Q^2$ is independently hydrogen, halogen, primary or secondary lower alkyl, phenyl or hydrocarbonoxy;

each $R^1$ is independently $C_{1-8}$ primary or secondary alkyl, phenyl or halo;

each $R^2$ is independently hydrogen, methyl, ethyl or phenyl;

each $R^3$ is independently $C_{1-4}$ primary or secondary alkyl or halo;

m is from 0 to 4;

n is 0 or 1;

p is from 0 to 3; and x is from 1 to about 5.

An essential feature of the compositions of this invention is the presence of moieties of formula I, wherein A is a divalent spirobiindane radical of formula III. Such moieties are believed to be particularly adaptable to cyclics formation by reason of their molecular geometry.

In formula III, the $R^3$ values, if any, may be $C_{1-4}$ primary or secondary alkyl or halo, and are usually methyl or chloro. The value of p may be from 0 to 3, and is preferably 0 or 1 and especially 0. Thus, the preferred spirobiindane radical is that of 6,6'-dihydroxy-3,3,3',3'-tetramethyl-1,1'-spiro(bis)indane (hereinafter "SBI").

The compositions are generally mixtures of oligomers, and said mixtures may contain molecular species with more then one moiety of formula I. Also present may be homopolycarbonates containing moieties of formula I, as well as linear polycarbonates containing 20 or more and preferably 30 or more carbonate units (hereinafter "high polymer").

Also present in the cyclic oligomers are units of formula II. In that formula, the $R^1$ values, if any, may be $C_{1-8}$ primary or secondary alkyl, phenyl or halo and are preferably methyl, phenyl or chloro. The value of m may be from 0 to 4; it is usually from 0 to 2 and preferably 0.

The moieties of formula II may also contain a methylene or substituted methylene bridge linking two of the aromatic rings (i.e., n is 1). The substitutents on said bridge, if any, are methyl, ethyl or phenyl, with methyl being preferred. Especially preferred are the compounds in which each $R^2$ is methyl, m is 0 and n is 1; that is, compounds derived from bisphenol A.

Also present in the moiety of formula II are from 1 to about 5, and preferably from 1 to 3, phenylene ether units. Examples of suitable primary lower alkyl groups suitable for $Q^1$ and $Q^2$ therein are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any such alkyl radicals are straight chain rather than branched. Most often, each $Q^1$ is alkyl or phenyl, especially $C_{1-4}$ alkyl and preferably methyl, and each $Q^2$ is hydrogen.

The cyclic oligomer compositions of this invention may be prepared by reacting (A) a mixture of (A-1) at least one spirobiindane compound of the formula

$$Y^1\text{-O-A-O-}Y^1 \qquad (IV)$$

and (A-2) at least one oligomeric compound of the formula

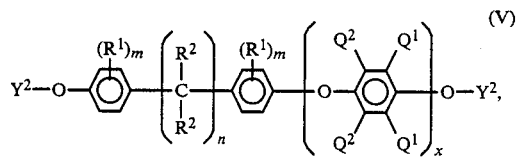

(V)

wherein A, $Q^1$, $Q^2$, $R^1$, $R^2$, m, n and x are as defined hereinabove, $Y^1$ and $Y^2$ in each compound are both hydrogen or

and X is chlorine or bromine, with the proviso that at least one of $Y^1$ and $Y^2$ is

with (B) at least one oleophilic, aliphatic or heterocyclic tertiary amine, and (C) an aqueous alkali or alkaline earth metal hydroxide or carbonate solution;

in (D) a substantially non-polar organic liquid which forms a two-phase system with water. The details of preparation are similar to those for preparing cyclic polycarbonate oligomers as described in the aforementioned U.S. Pat. No. 4,644,053 and in copending, commonly owned application Ser. No. 888,673, filed July 24, 1986, now U.S. Pat. No. 4,740,583, the disclosures of which are incorporated by reference herein. This method of preparation is another aspect of the invention.

The oligomeric compounds of formula V, useful as reagent A-2, are polyphenylene ether-derived bisphenols and their bishaloformate derivatives. They may be prepared by equilibration of a polyphenylene ether with a bisphenol of the formula

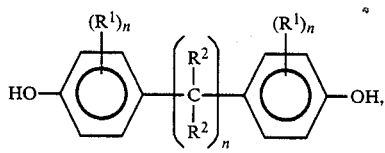

wherein $R^1$, $R^2$, m and n are as previously defined, in the presence of a phenoxy radical which may be generated by a diphenoquinone. A bisphenol containing no more than about 5 polyphenylene ether units is desired, and it may be produced by employing a ratio of moles of bisphenol to units in the polyphenylene ether of at least about 0.1:1 and preferably about 0.1–1.0:1. This method of preparing polyphenylene ether-derived bisphenols is disclosed, for example, in U.S. Pat. No. 3,496,236, the disclosure of which is also incorporated by reference herein.

It will be apparent that at least one of reagent A-1 and reagent A-2 must be a bishaloformate. While the X values may be chlorine or bromine, the bischloroformates, in which X is chlorine, are most readily available and their use is therefore preferred. Frequent reference to bischloroformates will be made hereinafter, but it should be understood that other bishaloformates may be substituted therefor as appropriate.

Bischloroformates useful as reagent A may be prepared by known methods, typically involving the reaction of the corresponding dihydroxy compound with phosgene in the presence of an amine and/or aqueous alkali metal hydroxide. Such reactions are disclosed, for example, in U.S. Pat. Nos. 3,189,640, 3,255,230, 3,312,661, 3,966,785, 3,974,126 and 4,638,077, and in British Pat. No. 613,280. The preparation of spirobiindane bisphenol bischloroformates is disclosed in copending, commonly owned application Ser. No. 926,685, filed Nov. 4, 1986, the disclosure of which is also incorporated by reference herein.

The molar ratio of reagent A-1 to reagent A-2 employed according to the invention is generally about 5–10:1. It is preferably about 7–8:1.

The tertiary amines useful as reagent B ("tertiary" in this context denoting the absence of N-H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic heterocarbonate. For the most part, such amines contain at least about 6 and preferably about 6–14 carbon atoms.

The amines most useful as reagent B are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness.

Reagent C is an aqueous alkali or alkaline earth metal hydroxide or carbonate solution, such as lithium, sodium, potassium or calcium hydroxide or sodium or potassium carbonate. It is most often lithium, sodium or potassium hydroxide, with sodium hydroxide being preferred because of its availability and relatively low cost. The concentration of said solution is not critical; it is generally about 0.1–16M, preferably about 0.2–10M and most desirably no higher than about 5M.

The fourth essential component (component D) in the cyclic oligomer preparation method of this invention is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer composition, the reagents and components are maintained in contact under conditions whereby reagent A is present in low concentration. Actual high dilution conditions, requiring a large proportion of component D, may be employed but are usually not preferred for cost and convenience reasons. Instead, simulated high dilution conditions known to those skilled in the art may be employed. For example, in one embodiment of the method reagent A or reagents A and B are added gradually to a mixture of the other materials. It is within the scope of this embodiment to incorporate reagent B in the mixture to which reagent A is added, or to add it gradually, either in admixture with reagent A or separately. Continuous or incremental addition of reagent B is frequently preferred.

Although addition of reagent A neat (i.e., without solvents) is within the scope of this embodiment, it is often preferably added as a solution in a portion of component D. The proportion of organic liquid used for this purpose is not critical; about 25-75% by weight, and especially about 40-60%, is often preferred. The reaction temperature is generally in the range of about 0°-50° C. and is most often about 40°-50° C.

For maximization of the yield and purity of the desired cyclic oligomers, it is preferred to use up to about 0.7 mole and preferably about 0.1-0.6 mole of reagent A per liter of component D in the reaction system, including any liquid used to dissolve reagent A. (It should be noted that this is not a molar concentration in component D when reagent A is added gradually, since said reagent is consumed as it is added to the reaction system.) The preferred molar ratio of reagent B to reagent A is about 0.05-5:1 and most often about 0.1-1.0:1. The molar ratio of reagent C to reagent A is usually about 1-5:1.

A highly preferred embodiment of the method for preparing the cyclic heterocarbonates comprises gradually adding reagent A and at least a portion of reagents B and C simultaneously to a substantially non-polar organic liquid (component D) or to a mixture of said liquid with water. A factor of some importance in this embodiment is the concentration of available reagent B, which should be maintained at a level as constant as possible during the entire addition period for reagent A. If all of reagent B is present in the reaction vessel into which reagent A is introduced, its concentration steadily decreases, principally by dilution. On the other hand, if reagent B is introduced continuously or in equal increments during introduction of reagent A, its available concentration is initially low and increases more or less steadily during the addition period. These fluctuations can result in a high and constantly varying proportion of high polymer (i.e., linear or cyclic polymer with a weight average molecular weight higher than about 30,000) in the product.

It has been found advantageous to introduce reagent B in one initial large portion, usually about 40-95% and preferably about 40-75% by weight of the total amount, followed by incremental or continuous addition of the balance thereof. By this procedure, the concentration of available reagent B is maintained at a fairly constant level in the organic phase during the entire addition period, and it is possible to minimize the proportion of high polymer in the product.

Under these conditions, it is usually advantageous for the reaction vessel to initially contain about 5-40% and preferably about 5-30% of total reagent C. The balance thereof is also introduced continuously or incrementally.

In general, cyclic oligomer compositions prepared under these conditions contain very low proportions of linear oligomers. In many instances no more than about 5% by weight, and frequently no detectable amount, of such linear oligomers are present. When necessary, linears, high polymer and other impurities may be removed by conventional operations such as combining the solution with a non-solvent for said impurities.

The preparation of cyclic oligomer compositions of this invention is illustrated by the following examples.

EXAMPLE 1

A three-necked, 50 ml. Morton flask equipped with a reflux condenser, mechanical stirrer and septum cap was charged with 11 ml. of methylene chloride, 2 ml. of water, 48 microliters of triethylamine and 0.15 ml. of 4M aqueous sodium hydroxide solution. The mixture was heated to 45° C., with mechanical stirring at a rate just sufficient to disperse the water in the methylene chloride. There were then added simultaneously, via four syringes, a solution of 1.04 grams of SBI bischloroformate in 5 ml. of methylene chloride, a solution of 110 mg. of 2-(4-hydroxyphenyl)-2-[4-(3,5-dimethyl-4-hydroxyphenoxy)phenyl]propane (prepared, for example, as described in Example 9 of U.S. Pat. No. 3,496,236) in 2 ml. of methylene chloride, a solution of 25 microliters of triethylamine in 75 microliters of methylene chloride, and 1.35 ml. of the aqueous sodium hydroxide solution. One-tenth of the contents of each syringe was charged to the reaction vessel every 3 minutes, for a total addition time of 30 minutes. There were thus provided, per mole of SBI bischloroformate (reagent A-1), 130 mmol. of bisphenol (reagent A-2), 440 mmol. of triethylamine and 5 moles of sodium hydroxide.

The mixture was stirred for an additional 3 minutes and diluted with 100 ml. of methylene chloride. The organic phase was washed twice with aqueous hydrochloric acid solution and once with aqueous sodium chloride solution, filtered through phase separation paper and vacuum stripped. The product which separated as a white flaky solid was shown by high pressure liquid chromatography to comprise 25% high polymer, about 36% cyclic SBI homopolycarbonate and about 36% mixed cyclic polycarbonate oligomers. Upon analysis by field desorption mass spectroscopy, the following oligomers were detected:

| Formula I units | Formula II units |
|---|---|
| 1 | 1 |
| 2 | 1 |
| 3 | 1 |

| Formula I units | Formula II units |
| --- | --- |
| 4 | 1 |
| 2 | 3 |
| 3 | 2 |

No linear oligomers were found.

EXAMPLE 2

A solution of 18.22 grams of poly(2,6-dimethyl-1,4-phenylene ether) having a number average molecular weight of 20,000 as determined by gel permeation chromatography, 6.92 grams of bisphenol A and 200 ml. of toluene was heated to 120° C., with stirring, as 420 milligrams of 3,3′5,5′-tetramethyl-4,4′-diphenylquinone was added in three equal portions at 1-hour intervals. The mixture was heated for an additional 4 hours and vacuum stripped. The residue was dissolved in 200 ml. of methylene chloride and refrigerated at 3° C., whereupon unreacted polyphenylene ether precipitated as the methylene chloride complex.

The filtrate was vacuum stripped to afford 23.3 grams of a yellow solid shown by field desorption mass spectroscopy to comprise oligomers of formula V wherein each $Y^2$ is hydrogen. A major proportion of the compounds detected had a value for x of less then 16, with said value in a large proportion being less than 5.

A reaction vessel identical to that of Example 1 was charged with 10 ml. of methylene chloride, 1.5 ml. of water, 0.16 ml. of aqueous sodium hydroxide solution and 51 microliters of triethylamine. Following the procedure of Example 1, there were then added a solution of 1.09 grams of SBI bischloroformate in 4 ml. of methylene chloride, a solution of 290 mg. of the above-prepared oligomer composition in 2 ml. of methylene chloride, a solution of 26 microliters of triethylamine in 74 microliters of methylene chloride and 1.4 ml. of aqueous sodium hydroxide solution. There were thus provided, per mole of SBI bischloroformate (reagent A-1), 130 mmol. of bisphenol (reagent A-2), 440 mmol. of triethylamine and 5 moles of sodium hydroxide.

Upon workup and isolation as described in Example 1, there was obtained 1.2 grams of a flaky solid which was shown by high pressure liquid chromatography to comprise 40% high polymer, about 30% cyclic SBI homopolycarbonate oligomers and about 30% mixed cyclic oligomers. The latter were shown by field desorption mass spectrometry to include molecular species containing one unit of formula II and the following other structural details:

| Formula I units | x |
| --- | --- |
| 1 | 2 |
| 2 | 1 |
| 2 | 3 |

No linear oligomers were detected.

The cyclic oligomer compositions of this invention are useful as intermediates for conversion to copolycarbonates. Accordingly, the present invention includes a method for the preparation of a resinous composition which comprises contacting said cyclic oligomer composition with a polycarbonate formation catalyst at a temperature up to about 350° C. It also includes linear copolycarbonates comprising structural units of formulas I and II.

Previously known methods for forming (e.g., molding) copolycarbonates are often cumbersome because of their high viscosities. On the other hand, it has not been possible to integrate preparation methods involving the use of phosgene or various monomeric esters with forming operations because of the presence of volatile solvents such as methylene chloride or by-products such as phenol, during or after polymerization. By contrast, at resin formation temperatures the cyclic oligomer compositions of this invention are liquid and substantially non-volatile and have relatively low viscosities. Moreover, their polymerization need not involve solvents or form undesirable by-products. Thus, it is possible to integrate resin formation with such forming operations.

For example, the cyclic oligomer compositions may be polymerized during extrusion or molding operations, upon raising their temperature to conventional extrusion or molding temperatures. Molding and simultaneous polymerization may be achieved by several known techniques, including injection molding and rotational molding. The molded articles thus produced have numerous advantageous properties illustrated by high thermal stability, solvent resistance and impact strength.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomer mixtures. Examples thereof are lithium phenoxide, lithium 2,2,2-trifluoroethoxide, n-butyllithium and tetramethylammonium hydroxide. Also useful are various weakly basic salts such as sodium benzoate and lithium stearate.

Another class of basic catalysts is disclosed in copending commonly owned application Ser. No. 941,901, filed Dec. 15, 1986, now U.S. Pat. No. 4,701,519, the disclosure of which is also incorporated by reference herein. It comprises polymers containing alkali metal phenoxide and especially lithium phenoxide moieties. They are usually present as end groups, especially on linear polycarbonates having a number average molecular weight in the range of about 8,000–20,000 as determined by gel permeation chromatography relative to polystyrene. Such catalysts may be produced by reacting a suitable polymer with an alkali metal base, typically at a temperature in the range of about 200°–300° C.

A particularly useful class of Lewis bases, disclosed in U.S. Pat. No. 4,605,731, includes numerous tetraarylborate salts, including lithium tetraphenylborate, sodium tetraphenylborate, sodium bis(2,2′-biphenylene)-borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The copolycarbonate formation reaction is typically effected, by merely contacting the cyclic oligomer mixture, either purified or in crude form, with the catalyst at temperatures up to 350° C., preferably about 200°–300° C., until polymerization has proceeded to the extent desired. Although the use of a solvent is within the scope of the invention, it is generally not preferred. In general, the amount of catalyst used is about 0.001–1.0 mole percent based on carbonate structural units in the oligomer composition.

The conditions of the polymerization reaction may be varied to produce resinous compositions of various molecular weights and molecular weight distributions (i.e., Mw/Mn ratios). Molecular weight can be controlled by varying the amount of catalyst, with a decrease in said amount generally resulting in an increase in molecular weight, or by employing known chain transfer or endcapping agents, of which diphenyl carbonate is an example, typically in amounts up to about 2.5 mole percent based on carbonate structural units in the oligomer composition.

Among the processing operations which can be conducted simultaneously with polymerization are various extrusion and molding operations. Thus, the cyclic oligomer compositions may be combined with polycarbonate formation catalysts of the type described hereinabove and fed to an extruder which is maintained at polymerization temperature. The effluent from the extruder is then a polycarbonate in the desired sheet, rod or other form. The molecular weight of the product may be adjusted over a wide range by methods previous described.

Similarly, the cyclic oligomer compositions may be combined with polycarbonate formation catalysts and injection molded at polymerization temperatures. Said compositions also have flow properties adequate for rotational molding simultaneous with polymerization. These capabilities make it possible to employ the cyclic oligomer compositions of this invention is operations previously unavailable with respect to copolycarbonates.

The cyclic oligomer compositions of this invention are also advantageously combined with inert filler materials to produce prepreg compositions which may be polymerized to thermoplastic composites having excellent impact resistance, moisture resistance and ductility. The composites have a number of advantages over the somewhat more well known thermoset composites, such as the capability of being shaped after polymerization is completed.

The preparation of copolycarbonates from the cyclic oligomer compositions of this invention is illustrated by the following examples. All molecular weights are weight average and were determined by gel permeation chromatography relative to polystyrene.

EXAMPLE 3

There were dissolved in 40 ml. of methylene chloride 8 mg. of tetra-n-butylammonium tetraphenylborate and 1.6 grams of the product of Example 1. The solution was vacuum stripped and the solids were dried at reduced pressure under nitrogen at 110° C. The dried product was heated for 15 minutes at 285° C. under nitrogen. The resulting copolycarbonate had a weight average molecular weight of 35,000 and a number average molecular weight of 13,000.

EXAMPLE 4

The procedure of Example 3 was repeated, substituting 1.5 grams of the product of Example 2 for the product of Example 1. The resulting copolycarbonate had a weight average molecular weight of 46,000 and a number average molecular weight of about 17,600.

What is claimed is:

1. A composition comprising cyclic oligomers containing at least one moiety of the formula

in combination with at least one moiety of the formula

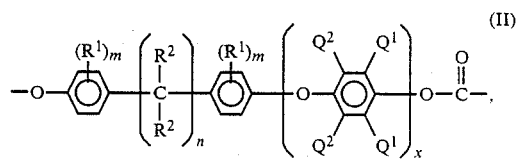

wherein:

A is a divalent spirobiindane radical of the formula

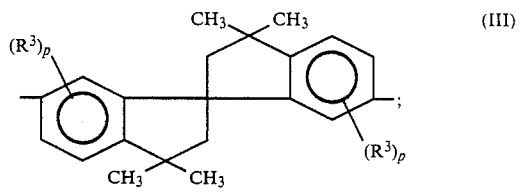

each $Q^1$ is independently halogen, primary or secondary lower alkyl, phenyl or hydrocarbonoxy;

each $Q^2$ is independently hydrogen, halogen, primary or secondary lower alkyl, phenyl or hydrocarbonoxy;

each $R^1$ is independently $C_{1-8}$ primary or secondary alkyl, phenyl or halo;

each $R^2$ is independently hydrogen, methyl, ethyl or phenyl;

each $R^3$ is independently $C_{1-4}$ primary or secondary alkyl or halo;

m is from 0 to 4;

n is 0 or 1;

p is from 0 to 3; and x is from 1 to about 5.

2. A composition according to claim 1 wherein p is 0.

3. A composition according to claim 2 wherein each $Q^1$ is methyl and each $Q^2$ is hydrogen.

4. A composition according to claim 3 wherein m is 0.

5. A composition according to claim 4 wherein each $R^2$ is methyl.

6. A composition according to claim 5 wherein x is from 1 to 3.

7. A method for preparing a composition according to claim 1 which comprises reacting
(A) a mixture of (A-1) at least one spirobiindane compound of the formula $$Y^1\text{-O-A-O-}Y^1 \quad (IV)$$

and (A-2) at least one oligomeric compound of the formula

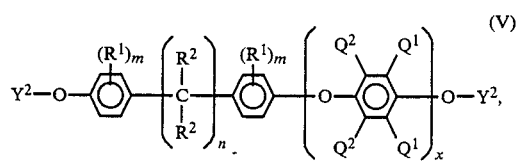

wherein $Y^1$ and $Y^2$ in each compound are both hydrogen or

and X is chlorine or bromine, with the proviso that at least one of $Y^1$ and $Y^2$ is

with
(B) at least one oleophilic, aliphatic or heterocyclic tertiary amine, and
(C) an aqueous alkali or alkaline earth metal hydroxide or carbonate solution;
in (D) a substantially non-polar organic liquid which forms a two-phase system with water.

8. A method according to claim 7 wherein p is 0, each $Q^1$ is methyl, each $Q^2$ is hydrogen and the molar ratio of (A-1) to (A-2) is about 5–10:1.

9. A method according to claim 8 wherein each $R^2$ is methyl, m is 0, x is from 1 to 3 and the molar ratio of (A-1) to (A-2) is about 7–8:1.

10. A method according to claim 9 wherein (B) is triethylamine, (C) is a sodium hydroxide solution and (D) is methylene chloride.

11. A method according to claim 9 wherein (A) and at least a portion of (B) and (C) are gradually and simultaneously added to (D) or to a mixture of (D) with water.

12. A method according to claim 11 wherein (B) is triethylamine, (C) is a sodium hydroxide solution and (D) is methylene chloride.

13. A method according to claim 12 wherein about 40–95% by weight of (B) is introduced initially and the balance is added continuously or incrementally.

* * * * *